United States Patent
Song et al.

(10) Patent No.: US 9,475,988 B2
(45) Date of Patent: Oct. 25, 2016

(54) POLYMER STABLE ALIGNMENT TYPE LIQUID CRYSTAL COMPOSITION AND USE THEREOF

(71) Applicant: JIANGSU HECHENG DISPLAY TECHNOLOGY CO., LTD., Yangzhong, Jiangsu (CN)

(72) Inventors: Xiaolong Song, Jiangsu (CN); Zhaoyuan Chen, Jiangsu (CN)

(73) Assignee: JIANGSU HECHENG DISPLAY TECHNOLOGY CO., LTD., Yangzhong, Jiangsu (CN)

( * ) Notice: Subject to any disclaimer, the term of this patent is extended or adjusted under 35 U.S.C. 154(b) by 0 days.

(21) Appl. No.: 14/765,462

(22) PCT Filed: Jan. 26, 2014

(86) PCT No.: PCT/CN2014/071447
§ 371 (c)(1),
(2) Date: Aug. 3, 2015

(87) PCT Pub. No.: WO2014/117692
PCT Pub. Date: Aug. 7, 2014

(65) Prior Publication Data
US 2015/0368558 A1 Dec. 24, 2015

(30) Foreign Application Priority Data
Feb. 1, 2013 (CN) .......................... 2013 1 0042237

(51) Int. Cl.
*G02F 1/1333* (2006.01)
*C09K 19/32* (2006.01)
*C09K 19/20* (2006.01)
*C09K 19/30* (2006.01)
*C09K 19/44* (2006.01)
*C09K 19/56* (2006.01)
*G02F 1/1337* (2006.01)
*C09K 19/06* (2006.01)
*C09K 19/04* (2006.01)
*C09K 19/12* (2006.01)
*C09K 19/54* (2006.01)

(52) U.S. Cl.
CPC ............ *C09K 19/32* (2013.01); *C09K 19/062* (2013.01); *C09K 19/20* (2013.01); *C09K 19/3066* (2013.01); *C09K 19/44* (2013.01); *C09K 19/54* (2013.01); *C09K 19/542* (2013.01); *C09K 19/56* (2013.01); *G02F 1/133788* (2013.01); *C09K 2019/0448* (2013.01); *C09K 2019/122* (2013.01); *C09K 2019/3027* (2013.01); *C09K 2019/548* (2013.01)

(58) Field of Classification Search
CPC .. C09K 19/32; C09K 19/20; C09K 19/3066; C09K 19/44; C09K 19/56; C09K 19/542; C09K 19/062; C09K 19/54; C09K 2019/0448; C09K 2019/122; C09K 2019/548; C09K 2019/3027; G02F 1/133788
USPC .............. 252/299.01, 299.6, 299.62; 428/1.1
See application file for complete search history.

(56) References Cited

U.S. PATENT DOCUMENTS

| 7,767,109 | B2 * | 8/2010 | Pai | ........................ | C09K 19/12 252/299.01 |
| 8,647,530 | B2 * | 2/2014 | Kuriyama | .............. | C09K 19/12 252/299.01 |

FOREIGN PATENT DOCUMENTS

| CN | 102888226 A | 1/2013 |
| JP | 2006-037053 A | 2/2006 |
| WO | 2012/086504 A1 | 6/2012 |

* cited by examiner

*Primary Examiner* — Geraldina Visconti
(74) *Attorney, Agent, or Firm* — Novick, Kim & Lee, PLLC; Allen Xue

(57) ABSTRACT

Provided are a stable alignment type liquid crystal composition and use thereof. The liquid crystal composition has negative dielectric anisotropy, better stability and a large absolute value of dielectric anisotropy. The liquid crystal composition comprises a compound of general formula (I) accounting for 10%-80% of the total weight of the liquid crystal composition, a compound of general formula (II) accounting for 0.0005%-0.5% of the total weight of the liquid crystal composition, a compound of general formula (IV) accounting for 15%-90% of the total weight of the liquid crystal composition, and a polymerizable compound accounting for 0.1%-5% of the total weight of the liquid crystal composition. The liquid crystal composition is less subject to interference of such factors as radicals, oxygen, heat or the like. Also provided is the use of the liquid crystal composition in a liquid crystal display device.

18 Claims, No Drawings

POLYMER STABLE ALIGNMENT TYPE LIQUID CRYSTAL COMPOSITION AND USE THEREOF

BACKGROUND OF THE INVENTION

1. Field of the Invention

The present invention relates to the field of electro-optical liquid crystal display materials and in particular, to a polymer stabilized alignment type liquid crystal composition with good stability and a liquid crystal display device using the same.

2. Description of Related Art

Liquid crystal display devices are used in household appliances represented by clocks and electronic calculators, measuring instruments, automotive panels, word processors, computers, printers, televisions or the like. For night scene, typical display modes include PC (phase change), TN (twist nematic), STN (super twisted nematic), ECB (electrically controlled birefringence), OCB (optically compensated bend), IPS (in-plane switching), VA (vertical alignment), CSH (color super homeotropic). Depending on the way in which the devices are driven, they can be divided into PM (passive matrix) type and AM (active matrix) type. PM is further divided into static type and multiplex type. AM is further divided into TFT (thin film transistor) type and MIM (metal insulator metal) type. TFT includes amorphous silicon type and polycrystalline silicon type. The later can be divided into high-temperature type and low-temperature type depending on the manufacturing process. Depending on the type of a light source, the liquid crystal display devices are divided into reflective type with natural light, transmissive type with backlight, and semi-transmissive type with both natural light and backlight.

Among these display modes, IPS, ECB, VA or CSH is different from commonly used TN or STN in that the former uses a liquid crystal material with negative dielectric anisotropy. Among these display modes, particularly AM-driven VA type, for applications requiring a display device with high speed and wide view, it is expected that liquid crystal display devices are applied in TV.

Like IPS mode, VA mode is normally black. The difference between the two modes is that in a VA mode panel, a negative liquid crystal is used as liquid crystal molecule in a liquid crystal layer, and transparent electrodes are disposed on upper and lower substrates to create an electric field perpendicular to the substrates. In non-powered conditions, the major axis of the liquid crystal molecule is perpendicular to the substrates to form a dark state; and in powered conditions, the major axis of the liquid crystal molecule is horizontally parallel to the substrates. The rubbing on the substrates is required for its initial alignment, which results in contamination, static electricity and pre-tilt angle being difficult to control. In order to address the initial alignment problems of VA mode, various derivative modes have been developed, such as MVA (multi-domain vertical alignment), PVA (patterned vertical alignment) and PSVA (polymer stabilized vertical alignment). Among theses, PSVA is becoming dominant for its high transmission, high contrast and fast response.

In PSVA mode, a polymerizable compound is used to control the arrangement direction of the liquid crystal molecule by applying an electric field to place the liquid crystal in a desirable arrangement state and performing UV exposure while maintaining at this state to polymerize the polymerizable compound in the mixed liquid crystal, thereby "curing" the desirable arrangement state of the liquid crystal.

No rubbing alignment process is required in the PSVA mode, such that unwanted problems of contamination and static electricity caused by rubbing in the TN and IPS modes can be avoided. However, since the polymerizable compound used in PSVA may polymerize due to light or heat, "unexpected" polymerization should be prevented during manufacture, storage, transportation and use of PSVA liquid crystals, which otherwise will significantly affect the final alignment of liquid crystals.

Also, the negative liquid crystal composition used in PSVA is required to have a larger absolute value of dielectric anisotropy ($|\Delta\varepsilon|$) in order to reduce the drive voltage, thereby meeting the requirements of low-carbon and energy saving.

A liquid crystal medium is disclosed in Chinese patent CN03146257.X, which comprises a negative liquid crystal monomer having a specific structure and a polymerizable compound. However, method and materials for preventing "unexpected" polymerization have not been mentioned therein.

A liquid crystal mixture for use in polymeric alignment is disclosed in Chinese patent CN200710148981.4, which comprises a negative liquid crystal monomer having a specific structure, a photo-polymerizable or thermally polymerizable monomer and an inhibiter having a specific structure. Although the stability of the liquid crystal mixture is improved, the absolute value of dielectric anisotropy ($|\Delta\varepsilon|$) is too low, which cannot meet the requirements of low drive voltage.

Thus, there is an urgent need for a new liquid crystal composition for use in the PSVA mode, which can not only provide a larger absolute value of dielectric anisotropy, but also effectively inhibit "unexpected" polymerization.

SUMMARY OF THE INVENTION

In order to address the problems above, the present invention provides a liquid crystal composition with negative dielectric anisotropy, which has better stability and a large absolute value of dielectric anisotropy.

The present invention provides a liquid crystal composition with negative dielectric anisotropy, comprising:

a compound of general formula (I) accounting for 10%-80% of the total weight of the liquid crystal composition:

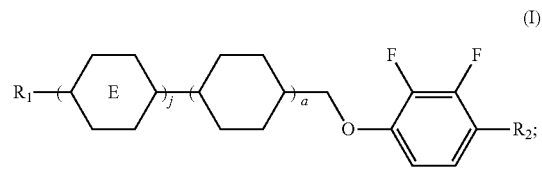

a compound of general formula (II) accounting for 0.0005%-0.5% of the total weight of the liquid crystal composition:

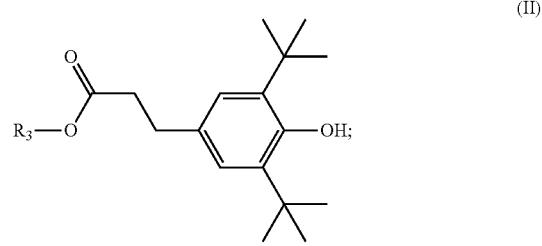

a compound of general formula (IV) accounting for 15%-90% of the total weight of the liquid crystal composition:

and a polymerizable compound accounting for 0.1%-5% of the total weight of the liquid crystal composition;

wherein, $R_1$ and $R_2$, which are the same or different, each are individually selected from the group consisting of C1-12 alkyl or alkoxy and C2-12 alkenyl or alkenoxy, in which one or more —$CH_2$— groups of $R_1$ and $R_2$ may be individually replaced by —CH=CH—, —O—, —CH=CF—, —CF=CH—, —CF=CF—, —CO—O— or —O—CO—, provided that oxygen atoms are not directly connected to each other;

$R_3$ indicates a C4-16 linear or branched, saturated alkyl;

$R_4$ and $R_5$, which are the same or different, each are individually selected from the group consisting of C1-12 alkyl or alkoxy and C2-12 alkenyl or alkenoxy;

the ring E is selected from the group consisting of 1,4-phenyl, naphthalen-2,6-diyl, 1,4-bicyclo[2,2,2]octylene, pyrimidin-2,5-diyl and

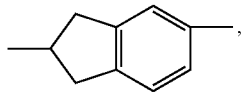, in which one or more H of 1,4-phenyl may be substituted with halo and one or more H of naphthalen-2,6-diyl may be substituted with halo;

$B_1$ and $B_2$, which are the same or different, each are individually selected from the group consisting of 1,4-cyclohexyl, 1,4-cyclohexenyl, piperidin-1,4-diyl, 1,4-bicyclo[2,2,2]octylene, 1,4-phenyl, pyridin-2,5-diyl, pyrimidin-2,5-diyl, naphthalen-2,6-diyl; trans-decahydronaphthalen-2,6-diyl, tetrahydronaphthalen-2,6-diyl and 1,2-indanyl, in which one or two $CH_2$ not directly connected to each other of 1,4-cyclohexyl may be replaced by 0 or S and one or more H of 1,4-phenyl may be substituted with halo;

$Y_1$ and $Y_2$, which are the same or different, each are individually selected from the group consisting of —OCO—, —COO—, —$CF_2$O—, —$OCF_2$—, —$CH_2$O—, —$OCH_2$—, —$CH_2CH_2$—, —$CF_2CF_2$—, —$CF_2CH_2$—, —CF=CF—, —CH=CH—, —C≡C—, —CH($CH_3$)$CH_2$—, —$CH_2$CH($CH_3$)—, —($CH_2$)$_3$O—, —O($CH_2$)$_3$—, —COS—, —SCO—, —CH=CF—, —($CH_2$)$_4$—, —$C_4F_8$—, —$OCF_2CF_2$O—, —$CF_2CF_2CF_2$O—, —$CH_2CH_2CF_2$O—, —$CH_2CF_2OCH_2$—, —CH=CHCF$_2$O—, —$CF_2$OCH=CH—, —$CF_2$OCF=CH—, —$CF_2$OCH=CF—, —CF=CFCF$_2$O—, —$CF_2$OCF=CF—, —CH=CHCH$_2CH_2$—, —$C_2H_4$OCH$_2$—, —$CH_2$CH=CHCH$_2$—, —OCH$_2CH_2CH_2$—, —CF=CF—CF=CF—, —C≡C—CF=CF—, —C≡C—CF=CF—C≡C—, —CF=CF—C≡C—CF=CF—, —C≡C—CF$_2$O— and a single bond;

$Y_2$ and $B_2$, at each occurrence, may be the same or different;

j is 0, 1 or 2;

a is 1 or 2;

c is 0, 1 or 2.

In the present invention, the compound of general formula (I) is used to generate negative dielectric anisotropy, so that the liquid crystal molecule can rotate under the action of an electric field.

In the present invention, the polymerizable compound comprising 2-4 polymerizable groups and polymerizable in radical polymerization is used to provide the ability of curing of alignment.

Radical polymerization has a faster rate of polymerization which can meet the requirements of rapid manufacturing process and does not result in contamination from ions as in other curing methods (such as cationic polymerization, anionic polymerization, etc.), which otherwise leads to substantial decrease in voltage holding ratio (VHR) of the liquid crystal and thus image sticking, flicker and other image defects.

The 2-4 polymerizable groups enable a polymer after polymerization to have a "bulk" cross-linked structure, which gives faster polymerization rate, higher glass transition temperature (Tg) and better mechanical strength. These advantages all can improve the degree of curing by the polymer on a desirable arrangement of the liquid crystal molecule, increase the durability of polymer alignment, and also enable a PSVA liquid crystal display device to operate at a wider range of temperature.

In the present invention, the compound of general formula (II) is used as stabilizer in the polymerization system to limit the radical concentration, so that polymerization conditions of the polymerizable compound can be manually controlled.

The polymerizable compound is selected from compounds of general formula (III):

wherein, $X_1$ and $X_2$ each individually indicate $P_1$—$K_1$ or

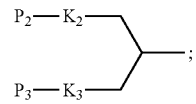

$P_1$, $P_2$ and $P_3$, which are the same or different, each individually indicate a polymerizable group selected from the group consisting of formulae B-1 to B-7:

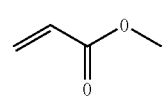

B-1

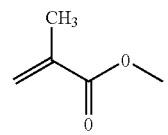

B-2

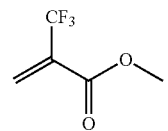

B-3

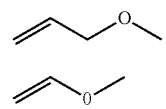

B-4

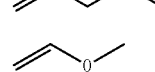

B-5

-continued

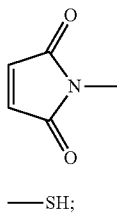
B-6

—SH;
B-7

$K_1$, $K_2$ and $K_3$, which are the same or different, each individually indicate a single bond or C1-12 alkylene, —$CH_2$— of which may be replaced by —O—, —S—, —CO—, —COO—, —OCO—, —OCOO—, —CH=CH—, —C=C— or —C≡C—;

$A_1$ and $A_2$, which are the same or different, each individually indicate 1,4-phenylene, 1,4-cyclohexylene, 1,4-bicyclo[2,2,2]octylene, pyrimidin-2,5-diyl, naphthalen-2,6-diyl, tetrahydronaphthalen-2,6-diyl, decahydronaphthalen-2,6-diyl, 1,3-dioxan-2,5-diyl or indan-2,5-diyl; and $A_1$ and $A_2$ are each individually unsubstituted or substituted with alkyl, haloalkyl, alkoxy, halo or cyano at one or more H atoms;

$Z_1$ indicates a single bond, —O—, —S—, —CO—, —COO—, —OCO—, —O—COO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CF—, —C≡C—, —CH=CH—COO— or —OOC—CH=CH—;

n and m, which are the same or different, each individually indicate 0, 1 or 2, and n+m>0.

In some embodiments, the polymerizable compound preferably is one in which:

$P_1$, $P_2$ and $P_3$, which are the same or different, each individually indicate a polymerizable group selected from the group consisting of formulae (B-1) to (B-3):

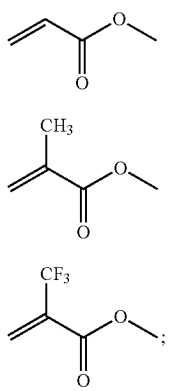
B-1

B-2

B-3

$K_1$, $K_2$ and $K_3$, which are the same or different, each individually indicate a single bond or C1-12 alkylene, —$CH_2$— of which may be replaced by —O—, —COO—, —OCO— or —OCOO—;

—($A_1$-$Z_1$)$_m$—($A_2$)$_n$— preferably is a structure represented by one of formulae (M1-1) to (M1-6) below:

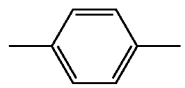
M1-1

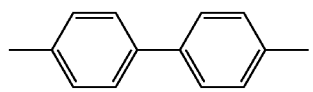
M1-2

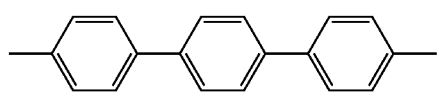
M1-3

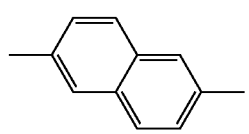
M1-4

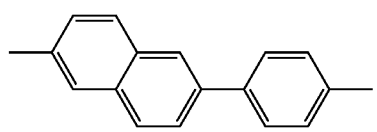
M1-5

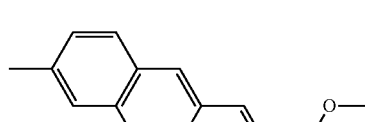
M1-6 wherein the aromatic rings may each individually be substituted with alkyl, alkoxy, fluoro, chloro or cyano.

In some embodiments, to further improve glass transition temperature (Tg) and mechanical strength of the polymer after polymerization, a flexible portion in the molecule may be reduced. Particularly, when $K_1$, $K_2$ and $K_3$ each indicate a single bond, the flexible portion in the molecule is completely removed, which results in the maximum values of glass transition temperature (Tg) and mechanical strength.

In other embodiments, exothermic phenomenon of curing exists during polymerization of the polymerizable compound. When curing activation energy of all the polymerizable groups is at the same level, there is a probability of explosive polymerization, which leads to local temperature increase, thereby changing the desirable arrangement state of the liquid crystal molecule here. If this wrong arrangement is cured, local poor display will occur. Therefore, in the present invention, the polymerizable groups are made to have different levels of curing activation energy, and particularly, acrylate groups and methacrylate groups are used in combination. At least one of the polymerizable groups $P_1$, $P_2$ and $P_3$, which are the same or different has a structure represented by formula (B-1).

In the present invention, a compound represented by general formula (I) and having a conjugated structure is used, and particularly, the aryl at the leftmost end and the aryl at the rightmost end are separated by the cyclohexyl in the middle, such that under an applied electric field, two torques will be generated simultaneously at both ends of the liquid crystal molecule, which can increase the absolute value of dielectric anisotropy and also improve the start speed of the liquid crystal molecule.

In some embodiments, the compound of general formula (I) preferably is one in which:

$R_1$ and $R_2$, which are the same or different, each are individually selected from the group consisting of C1-6 alkyl or alkoxy and C2-6 alkenyl or alkenoxy, in which one or more —$CH_2$— groups of $R_1$ and $R_2$ may be individually replaced by —CH═CH—, —O—, —CF═CF—, —CO—O— or —O—CO—, provided that oxygen atoms are not directly connected to each other;

the ring E is selected from the group consisting of 1,4-phenyl, naphthalen-2,6-diyl, and

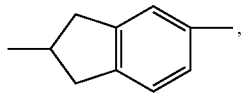

in which one or more H of 1,4-phenyl may be substituted with halo and one or more H of naphthalen-2,6-diyl may be substituted with halo;

j is 0, 1 or 2;

a is 1 or 2.

Further, in some embodiment, the compound of general formula (I) is selected from the group consisting of formulae (I-a) to (I-d):

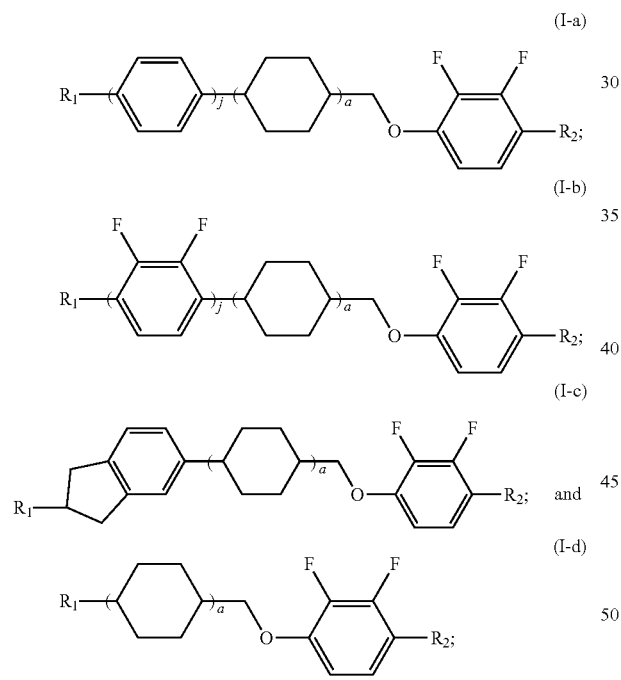

wherein, $R_1$ and $R_2$, which are the same or different, each are individually selected from the group consisting of C1-6 alkyl or alkoxy and C2-6 alkenyl or alkenoxy, in which one or more —$CH_2$— groups of $R_1$ and $R_2$ may be individually replaced by —CH═CH—, —O—, —CF═CF—, —CO—O— or —O—CO—, provided that oxygen atoms are not directly connected to each other;

j is 1 or 2;

a is 1 or 2.

In the present invention, a stabilizer, for example, represented by general formula (II) is used. The stabilizer of general formula (II) has a structure of hindered phenols, which can reduce the disturbance of radicals, oxygen and heat and the like on the liquid crystal molecule and the polymerizable compound.

However, the addition of the stabilizer may have negative effect on the performance of the liquid crystal. For example, to improve the compatibility of the stabilizer in the liquid crystal, the carbon number of a flexible alkyl chain may be suitably increased, but the longer alkyl chain may increase the viscosity of the liquid crystal, resulting in reduced response speed. Thus, the added amount of the stabilizer and the carbon number of the alkyl chain in the stabilizer need to be optimized.

In some embodiments, the compound represented by formula (II) accounts for 0.0005%-0.05% of the total weight of the liquid crystal composition, and $R_3$ preferably is a C12-16 linear, saturated alkyl.

Further, in some embodiments, the compound represented by general formula (II) accounts for 0.001%-0.02% of the total weight of the liquid crystal composition, and $R_3$ more preferably is a C12 or C16 linear, saturated alkyl.

In some embodiments, the compound represented by general formula (IV) comprises one or more compounds selected from the group consisting of the following compounds:

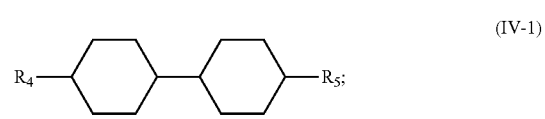

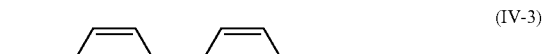

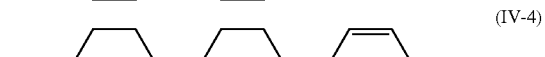

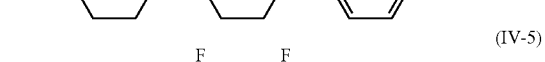

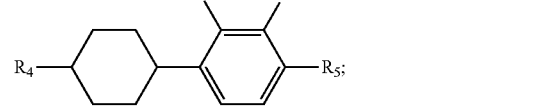

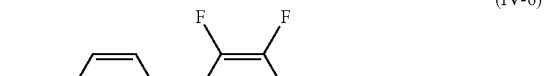

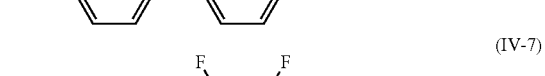

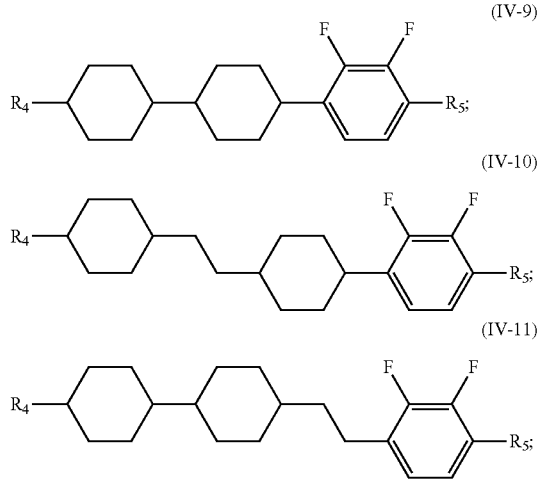

(IV-9)

(IV-10)

(IV-11)

R$_4$ and R$_5$, which are the same or different, each are individually selected from the group consisting of C1-8 alkyl or alkoxy and C2-8 alkenyl or alkenoxy.

In order to improve the upper limit of operating temperature of the PSVA liquid crystal and the polymerization rate of the polymerizable compound, the liquid crystal composition of the present invention may further comprise at least one compound of general formula (IV), in an amount of 0.1-5% by weight of the total liquid crystal composition:

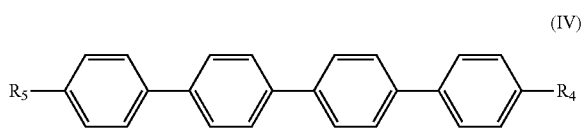

(IV)

wherein,

R$_5$ and R$_4$, which are the same or different, each are individually selected from the group consisting of C1-12 alkyl or alkoxy and C2-12 alkenyl or alkenoxy, in which one or more —CH$_2$— groups of R$_5$ and R$_4$ may be individually replaced by —CH=CH—, —O—, —CH=CF—, —CF=CH—, —CF=CF—, —CO—O— or —O—CO—, provided that oxygen atoms are not directly connected to each other;

the benzene rings may each individually be substituted with alkyl, alkoxy, fluoro, chloro or cyano.

In some embodiments, the compound of general formula (IV) is present in an amount of 0.5-5% by weight of the total liquid crystal composition, and R$_5$ and R$_4$, which are the same or different, each are individually selected from the group consisting of C1-6 alkyl or alkoxy and C2-6 alkenyl or alkenoxy, in which one or more —CH$_2$— groups of R$_5$ and R$_4$ may be individually replaced by —CH=CH—, —O—, —CO—O— or —O—CO—, provided that oxygen atoms are not directly connected to each other;

the benzene rings may each individually be substituted with C1-4 alkyl or alkoxy, fluoro, or chloro and the number of substituted H atoms is not more than 6.

Sum up, the liquid crystal composition of the present invention has negative dielectric anisotropy, good stability and a large absolute value of dielectric anisotropy. The liquid crystal composition of the present invention comprises at least one compound of general formula (I), at least one polymerizable compound and at least one compound of general formula (II). The liquid crystal composition is less subject to interference of such factors as radicals, oxygen, heat or the like, and thus "unexpected" polymerization can be avoided during manufacture, storage, transportation and use thereof.

In another aspect, the present invention also provides a liquid crystal display device using the liquid crystal composition of the present invention, and the use of the liquid crystal composition of the present invention in a liquid crystal display device.

BRIEF DESCRIPTION OF THE DRAWINGS

DETAILED DESCRIPTION OF THE INVENTION

The following examples are provided to illustrate the invention and do not limit the scope thereof, and all equivalent alterations or modifications, made by one of ordinary skill in the art without departing from the spirit of the present invention, are intended be included within the scope of the claims.

The VA-TFT liquid crystal display device is used in the following embodiments, with a cell thick d=7 μm and mainly made up of polarizers and electrode substrates. The display device is in a normally white mode, i.e., when no voltage difference is applied between the row and column electrodes, pixels appears white. The axes of the upper and lower polarizers on the substrates are set at an angle of 90°. The optical liquid crystal material is filled in the space between the two substrates.

For ease of illustration, in the following embodiments, the groups in the liquid crystal compound are expressed by the codes listed in table 1:

TABLE 1

Codes for groups in the liquid crystal compound

| Structure of groups | Code | Name of groups |
|---|---|---|
|  | C | 1,4-cyclohexylene |
|  | P | 1,4-phenylene |
|  | G | 2-fluoro-1,4-phenylene |
|  | W | 2,3-difluoro-1,4-phenylene |
|  | D | indan-2,5-diyl |

TABLE 1-continued

Codes for groups in the liquid crystal compound

| Structure of groups | Code | Name of groups |
|---|---|---|
| (cyclohexane ring) | C | 1,4-cyclohexylene |
| —CF₂O— | 1 (2F) O | difluoro ether |
| —O— | O | oxy substituent |
| —F | F | fluoro substituent |
| —CH=CH— | V | alkenyl |
| —C≡C— | T | alkynyl |
| —COO— | E | ester bridge |
| —C$_n$H$_{2n+1}$ or —C$_m$H$_{2m+1}$ | n or m | linear alkyl |

The structure below is taken as an example:

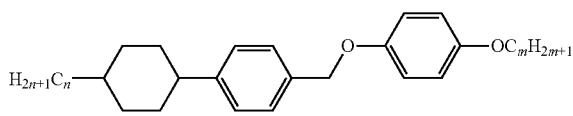

Using the codes in table 1, this structure may be expressed as nCP1OPOm, in which the code n represents the number of C atoms in the left alkyl, for example n is "3", indicating that the alkyl is —C₃H₇; the code C represents cyclohexyl; the code O represents oxygen atom; the code P represents phenylene; the code m represents the number of C atoms in the right alkyl, for example m is "1", indicating that the alkyl is —CH₃.

The components used in the embodiments may be synthesized by known methods, or obtained from commercial sources. These synthetic techniques are conventional, and each of the resulting liquid crystal compounds is tested to meet the electronic standards.

The liquid crystal compositions each are prepared in the proportions specified in the embodiments. Preparation of the liquid crystal compositions is performed according to conventional methods in the art, by mixing in the specified proportions using, for example, heating, ultrasound, suspending.

The liquid crystal compositions given in the following examples are prepared and tested. The composition and test results of performance parameters for the liquid crystal compositions are shown below.

The components, proportions and results of performance test when filled between two substrates in a liquid crystal display for the comparative liquid crystal composition are listed in table 2, for comparing with the performance of the inventive liquid crystal compositions.

The following examples are directed to the performance test for the inventive liquid crystal compositions, and each have a corresponding comparative example.

The tests in the examples are expressed by the representative symbols below, respectively:

Cp (° C.) clearing point (nematic-isotropic transition temperature)
Δn anisotropy in refractive index (589 nm, 20° C.)
Δ∈ dielectric anisotropy (1 KHz, 25° C.)

COMPARATIVE EXAMPLE

The liquid crystal composition C-1 in the comparative example was prepared using the compounds and weight percents listed in table 2, and tested for physical properties by filling between two substrates in the liquid crystal display. The test data are shown in table 2.

TABLE 2

Composition and performance test results of PSVA liquid crystal composition C-1 in comparative example

| C-1 | Component | Weight | Test results of physical properties | |
|---|---|---|---|---|
| Mixed liquid crystal: | 3CWO4 | 10 | Δn (589 nm, 20° C.) | 0.0903 |
| | 5CWO2 | 10 | Δ∈ (1 KHz, 25° C.) | −2.96 |
| | 3CCWO2 | 10 | Cp (° C.) | 80 |
| | 4CCWO2 | 10 | | |
| | 2CPWO2 | 12 | | |
| | 2CCW1 | 10 | | |
| | 3CCW1 | 10 | | |
| | 5CCEC3 | 4.5 | | |
| | 5CEP3 | 13 | Content of polymerizable | |
| | 5CC3 | 10 | 0 h | 0.5% |
| Polymerizable stabilizer | II-1 | 0.5 | 12 h | 0.2% |
| | none | none | 24 h | 0.15% |
| | Total | 100 | 48 h | 0.09% |

The polymerizable compound (III-1) has a structure:

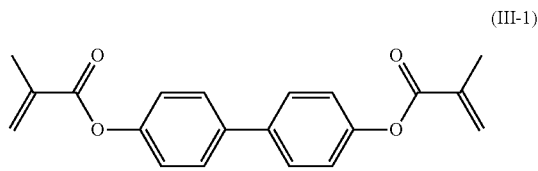

(III-1)

The comparative liquid crystal composition C-1 was filled into a brown high-borosilicate glass vial, placed in an oven at 80° C. under dark conditions, and tested for the content of the polymerizable compound in the liquid crystal composition after 0 h, 12 h, 24 h and 48 h baking, respectively, using high performance liquid chromatography (HPLC). The test data are listed in Table 2.

It can be seen from the test results that because no stabilizer is added in the comparative example, unexpected polymerization occurs during high-temperature storage and thus the content of the polymerizable compound is substantially decreased, which fails to meet the specifications of design and use.

EXAMPLE 1

The liquid crystal composition N-1 was prepared using the compounds and weight percents listed in table 3 and tested following the method in the comparative example. The test data are listed in table 3:

TABLE 3

Composition and performance test results of PSVA liquid crystal composition N-1 in example 1

| N-1 | Component | Weight | Test results of properties | |
|---|---|---|---|---|
| Mixed liquid crystal: | 3PCC1OWO2 | 10 | Δn (589 nm, 20° C.)) | 0.0973 |
| | 3WCC1OWO4 | 10 | Δ∈ (1 KHz, 25° C.)) | −4.0 |
| | 3PC1OWO2 | 10 | Cp (° C.) | 83 |
| | 4PC1OWO2 | 10 | | |
| | 3C1OWO2 | 12 | | |
| | 3C1OWO4 | 10 | | |
| | 3CC2 | 10 | | |
| | 5CCO1 | 4.5 | | |
| | 5CP3 | 13 | Content of Polymerizable | |
| | 5CC3 | 10 | 0 h | 0.495% |

TABLE 3-continued

Composition and performance test results of PSVA liquid crystal composition N-1 in example 1

| N-1 | Component | Weight | Test results of properties | |
|---|---|---|---|---|
| Poly-merizable stabilizer | III-1 | 0.495 | 12 h | 0.4% |
| | II-1 | 0.005 | 24 h | 0.34% |
| | Total | 100 | 48 h | 0.26% |

The stabilizer II-1 has a structure:

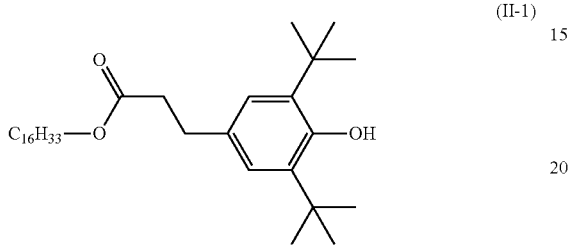

(II-1)

Compared to the comparative example, the stabilizer (II-1) is added in the liquid crystal composition N-1 in example 1, in an amount of 1% of the polymerizable compound. It can be seen from the test results that the change in content of the polymerizable compound (III-1) after high-temperature baking is significantly reduced, thereby improving the stability of the liquid crystal composition in operation.

Moreover, the compounds of general formulae (I-a), (I-b) and (I-d) are used in the liquid crystal composition N-1, and it is indicated from the test results that use of such compounds increases the absolute value of dielectric anisotropy.

EXAMPLE 2

The components were similar to those in example 1, except that the polymerizable compound was changed into a structure represented by (III-2):

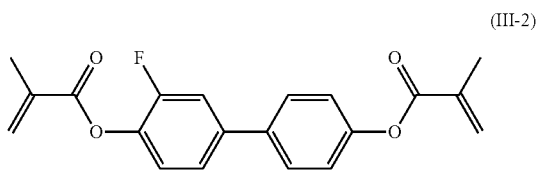 [SMILES: C=C(C)C(=O)Oc1ccc(-c2ccc(OC(=O)C(=C)C)c(F)c2)cc1]

(III-2)

The liquid crystal composition N-2 was prepared using the compounds and weight percents listed in table 4 and tested following the method in the comparative example. The test data are listed in table 4:

TABLE 4

Composition and performance test results of PSVA liquid crystal composition N-2 in example 2

| N-2 | Component | Weight | Test results of properties | |
|---|---|---|---|---|
| Mixed liquid crystal: | 3PCC1OWO2 | 10 | Δn (589 nm, 20° C.) | 0.0973 |
| | 3WCC1OWO4 | 15 | Δε (1 KHz, 25° C.) | −4.0 |
| | 3PC1OWO2 | 10 | Cp (° C.) | 83 |
| | 4PC1OWO2 | 15 | | |
| | 3C1OWO2 | 12 | | |
| | 3C1OWO4 | 10 | | |
| | 3CC2 | 5 | | |
| | 5CCO1 | 4.5 | | |

TABLE 4-continued

Composition and performance test results of PSVA liquid crystal composition N-2 in example 2

| N-2 | Component | Weight | Test results of properties | |
|---|---|---|---|---|
| | 5CP3 | 13 | Content of Poly-merizable | |
| | 5CC3 | 5 | 0 h | 0.495% |
| Poly-merizable stabilizer | III-2 | 0.495 | 12 h | 0.40% |
| | II-1 | 0.005 | 24 h | 0.32% |
| | Total | 100 | 48 h | 0.23% |

EXAMPLE 3

The components were similar to those in example 1, except that the polymerizable compound was changed into a structure represented by (III-3):

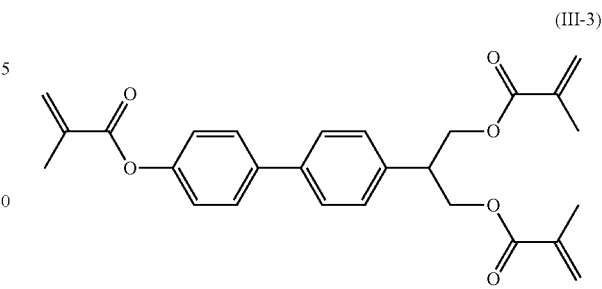

(III-3)

The liquid crystal composition N-3 was prepared using the compounds and weight percents listed in table 5 and tested following the method in the comparative example. The test data are listed in table 5:

TABLE 5

Composition and performance test results of PSVA liquid crystal composition N-3 in example 3

| N-3 | Component | Weight | Test results of properties | |
|---|---|---|---|---|
| Mixed liquid crystal: | 3PCC1OWO2 | 10 | Δn (589 nm, 20° C.) | 0.0973 |
| | 3WCC1OWO4 | 18 | Δε (1 KHz, 25° C.) | −4.0 |
| | 3PC1OWO2 | 10 | Cp (° C.) | 83 |
| | 4PC1OWO2 | 15 | | |
| | 3C1OWO2 | 12 | | |
| | 3C1OWO4 | 12 | | |
| | 3CC2 | 5 | | |
| | 5CCO1 | 4.5 | | |
| | 5CP3 | 8 | Content of Poly-merizable | |
| | 5CC3 | 5 | 0 h | 0.495% |
| Poly-merizable stabilizer | III-3 | 0.495 | 12 h | 0.38% |
| | II-1 | 0.005 | 24 h | 0.30% |
| | Total | 100 | 48 h | 0.20% |

EXAMPLE 4

The liquid crystal composition N-4 was prepared using the compounds and weight percents listed in table 6 and tested following the method in the comparative example. The test data are listed in table 6:

TABLE 6

Composition and performance test results of PSVA liquid crystal composition N-4 in example 4

| N-4 | Component | Weight | Test results of properties | |
|---|---|---|---|---|
| Mixed liquid crystal: | 2CC1OWO2 | 4 | Δn (589 nm, 20° C.) | 0.0910 |
| | 3CC1OWO2 | 5 | Δε (1 KHz, 25° C.) | −3.6 |
| | 3CC1OWO3 | 6 | Cp (° C.) | 80 |
| | 3C1OWO2 | 5 | | |
| | 2CPWO2 | 8 | | |
| | 3CPWO2 | 8 | | |
| | 3CC2 | 22.5 | | |
| | 4CC3 | 10 | | |
| | 5CC3 | 10 | | |
| | 5PP1 | 8 | | |
| | 3PPO2 | 9 | Content of Polymerizable | |
| | 3CCP1 | 4 | 0 h | 0.495% |
| Polymerizable compound | III-2 | 0.495 | 12 h | 0.40% |
| stabilizer | II-1 | 0.005 | 24 h | 0.32% |
| | Total | 100 | 48 h | 0.23% |

EXAMPLE 5

The liquid crystal composition N-5 was prepared using the compounds and weight percents listed in table 7 and tested following the method in the comparative example. The test data are listed in table 7:

TABLE 7

Composition and performance test results of PSVA liquid crystal composition N-5 in example 5

| N-5 | Component | Weight | Test results of properties | |
|---|---|---|---|---|
| Mixed liquid crystal: | 2DCC1OWO2 | 5 | Δn (589 nm, 20° C.) | 0.0958 |
| | 3DCC1OWO2 | 4 | Δε (1 KHz, 25° C.) | −3.9 |
| | 3PCC1OWO3 | 5 | Cp (° C.) | 84 |
| | 3C1OWO2 | 5 | | |
| | 2CPWO2 | 10 | | |
| | 3CPWO2 | 10 | | |
| | 3CC2 | 22.5 | | |
| | 4CC3 | 9 | | |
| | 5CC3 | 8 | | |
| | 5PP1 | 9 | | |
| | 3PWO2 | 8 | Content of Polymerizable | |
| | 3CCP1 | 4 | 0 h | 0.495% |
| Polymerizable | III-2 | 0.495 | 12 h | 0.40% |
| stabilizer | II-1 | 0.005 | 24 h | 0.32% |
| | Total | 100 | 48 h | 0.23% |

EXAMPLE 6

The liquid crystal composition N-6 was prepared using the compounds and weight percents listed in table 8 and tested following the method in the comparative example. The test data are listed in table 8:

TABLE 8

Composition and performance test results of PSVA liquid crystal composition N-6 in example 6

| N-6 | Component | Weight | Test results of properties | |
|---|---|---|---|---|
| Mixed liquid crystal: | 2CC1OWO2 | 9 | Δn (589 nm, 20° C.) | 0.1012 |
| | 3CC1OWO2 | 9 | Δε (1 KHz, 25° C.) | −4.1 |
| | 3CC1OWO3 | 6 | Cp (° C.) | 95 |
| | 3C1OWO2 | 11 | | |
| | 2CPWO2 | 8 | | |
| | 3CPWO2 | 8 | | |
| | 3CCV1 | 22.5 | | |
| | 4CC3 | 6 | | |
| | 5CC3 | 6 | | |
| | 5PP1 | 6 | | |
| | 3PPO2 | 4 | Content of Polymerizable | |
| | 4PGPP3 | 4 | 0 h | 0.495% |
| Polymerizable stabilizer | III-2 | 0.495 | 12 h | 0.41% |
| | II-1 | 0.005 | 24 h | 0.35% |
| | Total | 100 | 48 h | 0.26% |

The compound of general formula (IV) is used in the liquid crystal composition in example 6 and the test results indicates use of such a compound increases the clearing point of the liquid crystal composition, thereby improving the upper limit of operating temperature of the liquid crystal.

What is claimed is:

1. A liquid crystal composition with negative dielectric anisotropy, comprising:
   a compound of formula (I) accounting for 10%-80% of the total weight of the liquid crystal composition

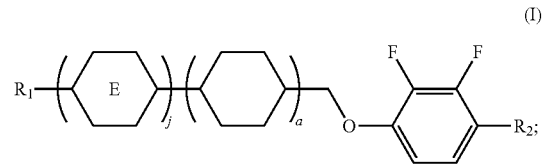

a compound of formula (II) accounting for 0.0005%-0.05% of the total weight of the liquid crystal composition

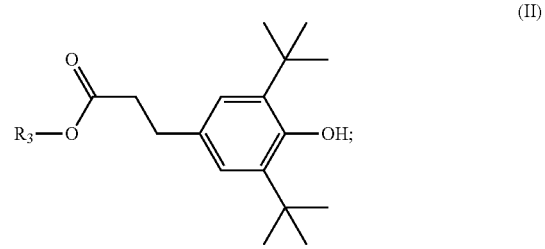

a compound of formula (IV) accounting for 15%-90% of the total weight of the liquid crystal composition

and
   a polymerizable compound accounting for 0.1%-5% of the total weight of the liquid crystal composition, wherein $R_1$ and $R_2$, which are the same or different, are each independently selected from the group consisting of C1-12 alkyl or alkoxy, C2-12 alkenyl or alkenoxy, C1-12 alkyl or alkoxy having one or more —CH$_2$— groups independently substituted with —CH=CH—, —O—, —CH=CF—, —CF=CH—, —CF=CF—, —CO—O— or —O—CO—, and C2-12 alkenyl or alkenoxy having one or more —CH$_2$— groups independently substituted with —CH=CH—, —O—, —CH=CF—, —CF=CH—, —CF=CF—, —CO—O— or —O—CO—, with the proviso that oxygen atoms in $R_1$ or $R_2$ are not directly connected to one another, $R_3$ is a C12-16 linear, saturated alkyl, $R_4$ and $R_5$, which are the same or different, are each independently selected from the group consisting of C1-12 alkyl or alkoxy and C2-12 alkenyl or alkenoxy, the ring E is selected from the group consisting of 1,4-phenyl, naphthalen-2,6-diyl, 1,4-bicyclo[2,2,2]octylene, pyrimidin-2,5-diyl,

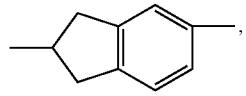

1,4-phenyl having one or more H of substituted with halo, and naphthalen-2,6-diyl having one or more H of naphthalen-2,6-diyl substituted with halo, $B_1$ and $B_2$, which are the same or different, are each independently selected from the group consisting of 1,4-cyclohexyl, 1,4-cyclohexenyl, piperidin-1,4-diyl, 1,4-bicyclo[2,2,2]octylene, 1,4-phenyl, pyridin-2,5-diyl, pyrimidin-2,5-diyl, naphthalen-2,6-diyl, trans-decahydronaphthalen-2,6-diyl, tetrahydronaphthalen-2,6-diyl and 1,2-indanyl, 1,4-cyclohexyl having one or two —CH$_2$— substituted with O or S, and of 1,4-phenyl having one or more H substituted with halo, $Y_1$ and $Y_2$, which are the same or different, are each independently selected from the group consisting of —OCO—, —COO—, —CF$_2$O—, —OCF$_2$—, —CH$_2$O—, —OCH$_2$—, —CH$_2$CH$_2$—, —CF$_2$CF$_2$—, —CF$_2$CH$_2$—, —CF=CF—, —CH=CH—, —C≡C—, —CH(CH$_3$)CH$_2$—, —CH$_2$CH(CH$_3$)—, —(CH$_2$)$_3$O—, —O(CH$_2$)$_3$—, —COS—, —SCO—, —CH=CF—, —(CH$_2$)$_4$—, —C$_4$F$_8$—, —OCF$_2$CF$_2$O—, —CF$_2$CF$_2$CF$_2$O—, —CH$_2$CH$_2$CF$_2$O—, —CH$_2$CF$_2$OCH$_2$—, —CH=CHCF$_2$O—, —CF$_2$OCH=CH—, —CF$_2$OCF=CH—, —CF$_2$OCH=CF—, —CF=CFCF$_2$O—, —CF$_2$OCF=CF—, —CH=CHCH$_2$CH$_2$—, —C$_2$H$_4$OCH$_2$—, —CH$_2$CH=CHCH$_2$—, —OCH$_2$CH$_2$CH$_2$—, —CF=CF—CF=CF—, —C≡C—CF=CF—, —C≡C—CF=CF—C≡C—, —CF=CF—C≡C— CF=CF—, —C≡C—CF$_2$O—, and a single bond, $Y_2$ and $B_2$ are the same or different, j is 0, 1 or 2, a is 1 or 2, c is 0, 1 or 2, and the polymerizable compound comprises 2-4 polymerizable groups and is polymerizable by radical polymerization.

2. The liquid crystal composition of claim 1, wherein the polymerizable compound is selected from compounds of formula (III)

$$X_1 - (A_1 - Z_1)_m - (A_2)_n - X_2 \quad \text{(III)},$$

wherein, $X_1$ and $X_2$ are each independently $P_1$—$K_1$— or

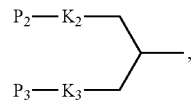

$P_1$, $P_2$ and $P_3$, which are the same or different, are each independently a polymerizable group selected from the group consisting of formulae (B-1) to (B-7):

B-1

B-2

B-3

B-4

B-5

B-6

—SH,    B-7

$K_1$, $K_2$ and $K_3$, which are the same or different, are each independently selected from a single bond, a C1-12 alkylene, and a C1-12 akylene having a —CH$_2$— group substituted with —O—, —S—, —CO—, —COO—, —OCO—, —OCOO—, —CH=CH—, —C=C—, or —C≡C—;

$A_1$ and $A_2$, which are the same or different, are each independently selected from the group consisting of substituted or unsubstituted 1,4-phenylene, 1,4-cyclohexylene, 1,4-bicyclo[2,2,2]octylene, pyrimidin-2,5-diyl, naphthalen-2,6-diyl, tetrahydronaphthalen-2,6-diyl, decahydronaphthalen-2,6-diyl, 1,3-dioxan-2,5-diyl, and indan-2,5-diyl, wherein the substituted $A_1$ and $A_2$ have one or more H atoms substituted with alkyl, haloalkyl, alkoxy, halo or cyano, $Z_1$ is a single bond, —O—, —S—, —CO—, —COO—, —OCO—, —O—COO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, or —OOC—CH=CH—;

m and n, which are the same or different, are each independently 0, 1 or 2, provided that m and n are not zero simultaneously.

3. The liquid crystal composition of claim 1, wherein in the compound of formula (I), R₁ and R₂, which are the same or different, are each independently selected from the group consisting of C1-6 alkyl or alkoxy, C2-6 alkenyl or alkenoxy, C1-6 alkyl or alkoxy having one or more —CH₂— groups independently substituted with —CH=CH—, —O—, —CF=CF—, —CO—O—, or —O—CO—, and C2-6 alkenyl or alkenoxy having one or more —CH₂— groups independently substituted with —CH=CH—, —O—, —CF=CF—, —CO—O—, or —O—CO—, with the proviso that oxygen atoms in R₁ or R₂ are not directly connected to one another, the ring E is selected from the group consisting of 1,4-phenyl, naphthalen-2,6-diyl,

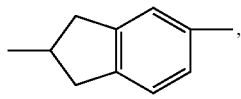

1,4-phenyl having one or more H substituted with halo, and naphthalen-2,6-diyl having one or more H substituted with halo;

j is 0, 1 or 2; and a is 1 or 2.

4. The liquid crystal composition of claim 1, wherein the compound of formula (II) accounts for 0.001%-0.02% of the total weight of the liquid crystal composition.

5. The liquid crystal composition of claim 1, wherein the compound of formula (IV) comprises one or more compounds selected from the group consisting of the following compounds:

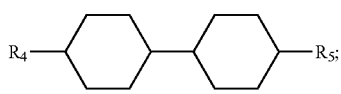 (IV-1)

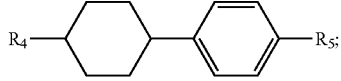 (IV-2)

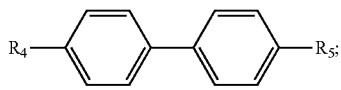 (IV-3)

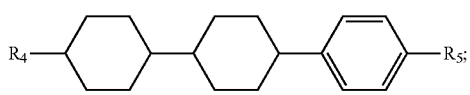 (IV-4)

 (IV-5)

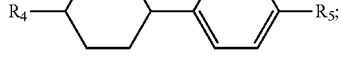 (IV-6)

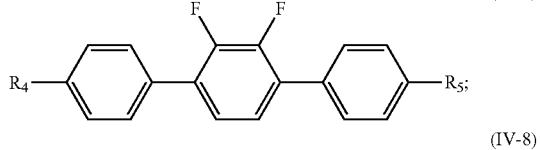 (IV-7)

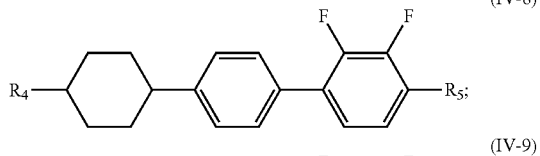 (IV-8)

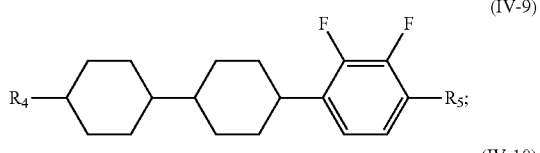 (IV-9)

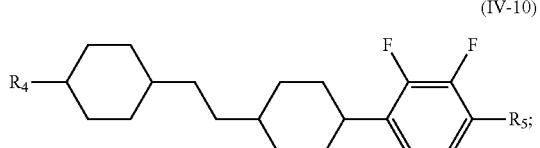 (IV-10)

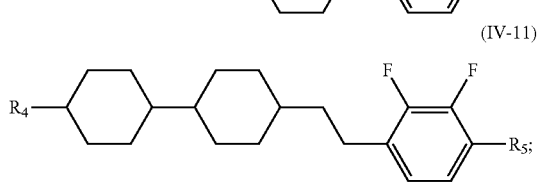 (IV-11)

wherein R₄ and R₅, which are the same or different, are each independently selected from the group consisting of C1-8 alkyl or alkoxy and C2-8 alkenyl or alkenoxy.

6. The liquid crystal composition of claim 3, wherein the compound of formula (I) is selected from the group consisting of formulae (I-a) to (I-d):

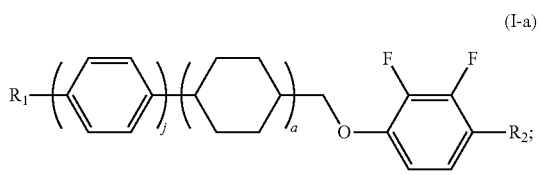 (I-a)

 (I-b)

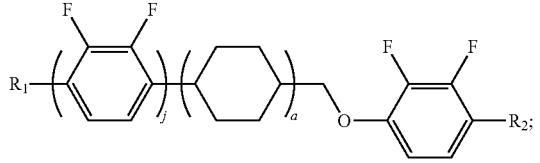 (I-c)

and

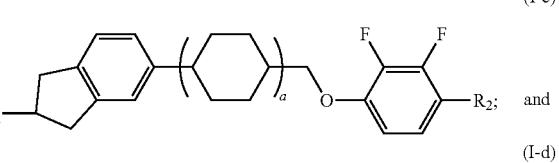 (I-d)

wherein R₁ and R₂, which are the same or different, are each are independently selected from the group consisting of C1-6 alkyl or alkoxy, C2-6 alkenyl or alkenoxy, C1-6 alkyl or alkoxy having one or more —CH₂— groups independently substituted with —CH═CH—, —O—, —CF═CF—, —CO—O—, or —O—CO—, and C2-6 alkenyl or alkenoxy having one or more —CH₂— groups independently substituted with —CH═CH—, —O—, —CF═CF—, —CO—O—, or —O—CO—, with the proviso that oxygen atoms in R₁ or R₂ are not directly connected to one another, j is 1 or 2, and a is 1 or 2.

7. The liquid crystal composition of claim 2, wherein in the polymerizable compound of formula (III), P₁, P₂ and P₃, which are the same or different, are each independently a polymerizable group selected from the group consisting of formulae (B-1) to (B-3):

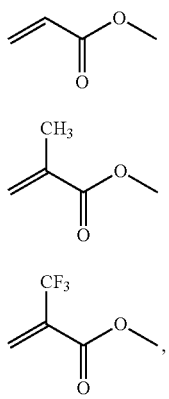

B-1

B-2

B-3

K₁, K₂ and K₃, which are the same or different, are each independently a single bond, C1-12 alkylene, or C1-12 alkylene having one or more —CH₂— substituted with —O—, —COO—, —OCO—, or —OCOO—, ─(A₁-Z₁)ₘ─(A₂)ₙ─ is a structure represented by one of formulae (M1-1) to (M1-6) below:

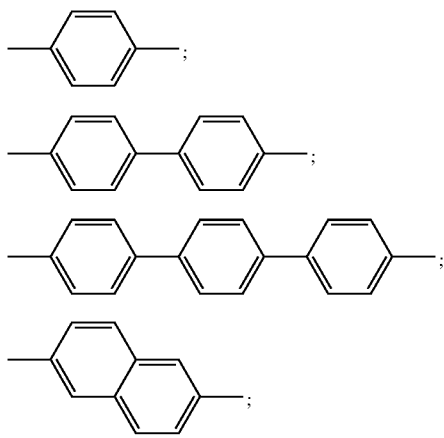

M1-1

M1-2

M1-3

M1-4

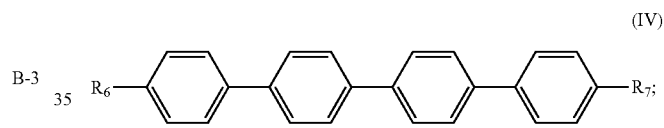

M1-5

M1-6 and substituted (M1-1) to (M1-6) having one or more aromatic rings thereof substituted with alkyl, alkoxy, fluoro, chloro, or cyano.

8. The liquid crystal composition of claim 7, wherein in the polymerizable compound of formula (III), K₁, K₂ and K₃ are each a single bond.

9. The liquid crystal composition of claim 8, wherein in the polymerizable compound of formula (III), P₁, P₂ and P₃, which are the same or different, are each independently a polymerizable group, and at least one of P₁, P₂ and P₃ has a structure represented by formula (B-1).

10. The liquid crystal composition of claim 1, further comprising at least one compound of formula (IV):

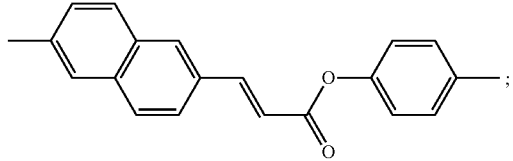

(IV)

wherein the at least one compound of formula (IV) is present in an amount of 0.1-5% by weight of the total liquid crystal composition, R₆ and R₇, which are the same or different, are each independently selected from the group consisting of C1-12 alkyl or alkoxy, C2-12 alkenyl or alkenoxy, C1-12 alkyl or alkoxy having one or more —CH₂— groups independently substituted with —CH═CH—, —O—, —CH═CF—, —CF═CH—, —CF═CF—, —CO—O—, or —O—CO—, and C2-12 alkenyl or alkenoxy having one or more —CH₂— groups independently substituted with —CH═CH—, —O—, —CH═CF—, —CF═CH—, —CF═CF—, —CO—O—, or —O—CO—, with the proviso that oxygen atoms in R₆ or R₇ are not directly connected to one another, and the benzene rings are unsubstituted or independently substituted with alkyl, alkoxy, fluoro, chloro, or cyano.

11. The liquid crystal composition of claim 10, wherein the compound of formula (IV) is present in an amount of 0.5-5% of the total weight of the liquid crystal composition, R₆ and R₇, which are the same or different, are each independently selected from the group consisting of C1-6 alkyl or alkoxy, C2-6 alkenyl or alkenoxy, C1-6 alkyl or alkoxy having one or more —CH₂— groups independently substituted with —CH═CH—, —O—, —CO—O—, or —O—CO—, and C2-12 alkenyl or alkenoxy having one or more —CH₂— groups independently substituted with —CH═CH—, —O—, —CO—O—, or —O—CO—, with the proviso that oxygen atoms in $R_6$ or $R_7$ are not directly connected to one another, each the benzene rings are unsubstituted or independently substituted with C1-4 alkyl or alkoxy, fluoro, or chloro and the number of substituted H atoms is not more than 6.

12. The liquid crystal composition of claim 1, wherein the liquid crystal composition comprises, based on the total weight of the liquid crystal composition, a compound 3PCC1OWO2 accounting for 10% of the liquid crystal composition

3PCC1OWO2

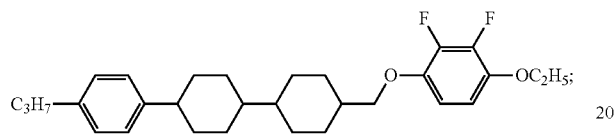

a compound 3WCC1OWO4 accounting for 10% of the liquid crystal composition

3WCC1OW04

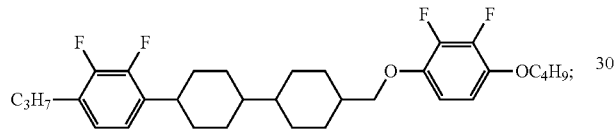

a compound 3PC1OWO2 accounting for 10% of the liquid crystal composition

3PC1OWO2

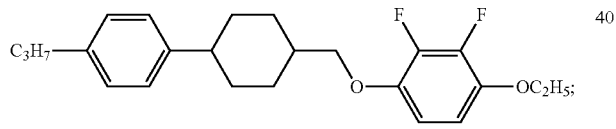

a compound 4PC1OWO2 accounting for 10% of the liquid crystal composition;

4PC1OWO2

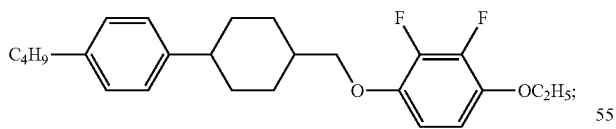

a compound 3C1OWO2 accounting for 12% of the liquid crystal composition

3C1OWO2

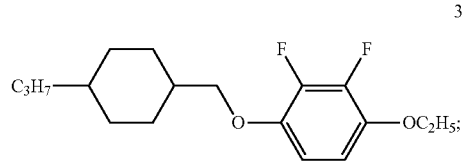

a compound 3C1OWO4 accounting for 10% of the liquid crystal composition

3C1OWO4

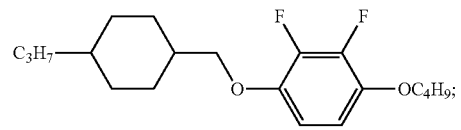

a compound 3CC2 accounting for 10% of the liquid crystal composition;

3CC2

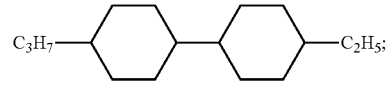

a compound 5CCO1 accounting for 4.5% of the liquid crystal composition;

5CCO1

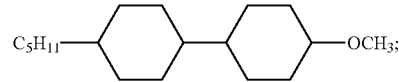

a compound 5CP3 accounting for 13% of the liquid crystal composition;

5CP3

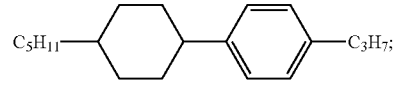

a compound 5CC3 accounting for 10% of the liquid crystal composition

5CC3

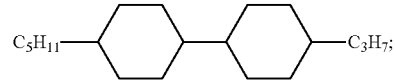

a compound III-1 accounting for 0.495% of the liquid crystal composition;

III-1

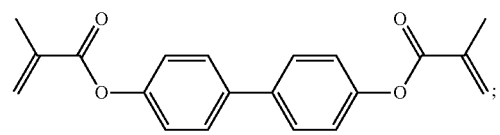

and a compound II-1 accounting for 0.005% of the liquid crystal composition

II-1

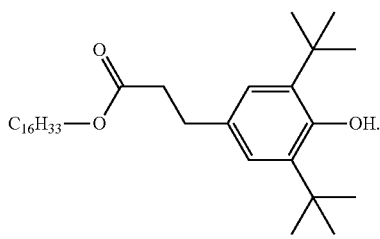

13. The liquid crystal composition of claim 1, wherein the liquid crystal composition comprises, based on the total weight of the liquid crystal composition, based on the total weight of the liquid crystal composition, a compound 3PCC1OWO2 accounting for 10% of the liquid crystal composition

3PCC1OWO2

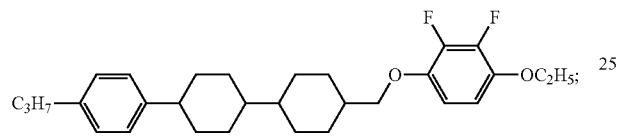

a compound 3WCC1OWO4 accounting for 15% of the liquid crystal composition

3WCC1OWO4

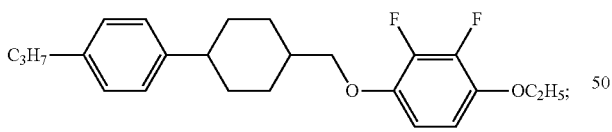

a compound 3PC1OWO2 accounting for 10% of the liquid crystal composition

3PC1OWO2

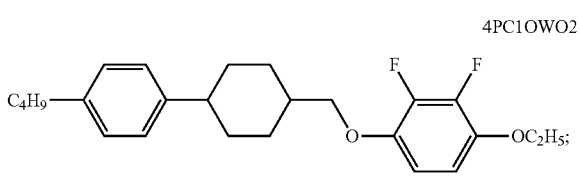

a compound 4PC1OWO2 accounting for 15% of the liquid crystal composition

4PC1OWO2

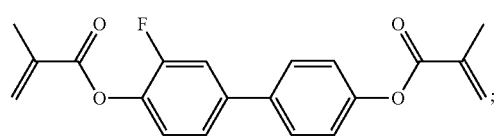

a compound 3C1OWO2 accounting for 12% of the liquid crystal composition

3C1OWO2

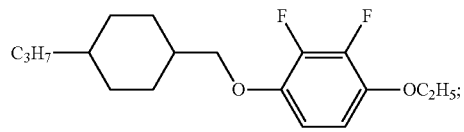

a compound 3C1WO4 accounting for 10% of the liquid crystal composition

3C1WO4

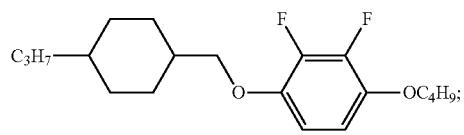

a compound 3CC2 accounting for 5% of the liquid crystal composition

3CC2

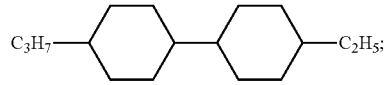

a compound 5CCO1 accounting for 4.5% of the liquid crystal composition

5CCO1

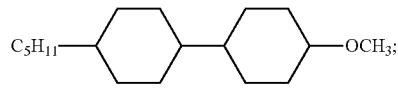

a compound 5CP3 accounting for 13% of the liquid crystal composition

5CP3

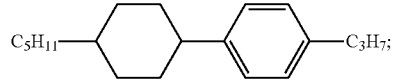

a compound 5CC3 accounting for 5% of the liquid crystal composition;

5CC3

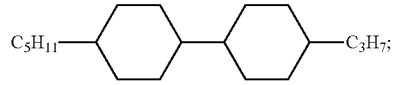

a compound III-2 accounting for 0.495% of the liquid crystal composition;

III-2

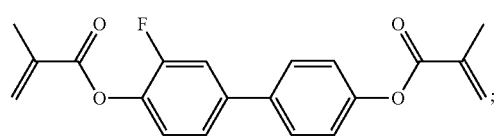

and a compound II-1 accounting for 0.005% of the liquid crystal composition;

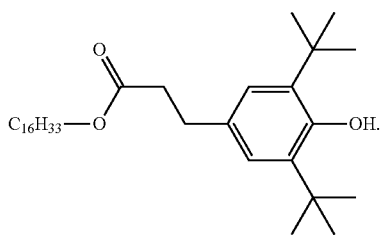

II-1

14. The liquid crystal composition of claim 1, wherein the liquid crystal composition comprises, based on the total weight of the liquid crystal composition, based on the total weight of the liquid crystal composition, a compound 3PCC1OWO2 accounting for 10% of the liquid crystal composition

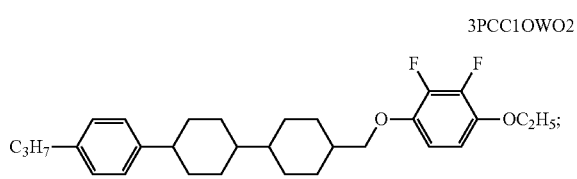

3PCC1OWO2 a compound 3WCC1OWO4 accounting for 18% of the liquid crystal composition

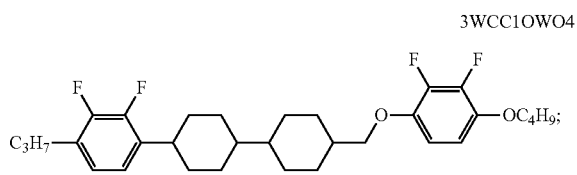

3WCC1OWO4 a compound 3PC1OWO2 accounting for 10% of the liquid crystal composition

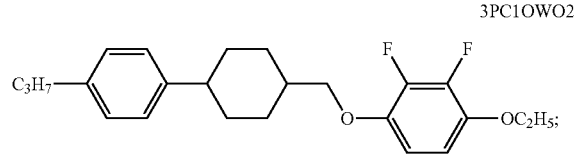

3PC1OWO2 a compound 4PC1OWO2 accounting for 15% of the liquid crystal composition

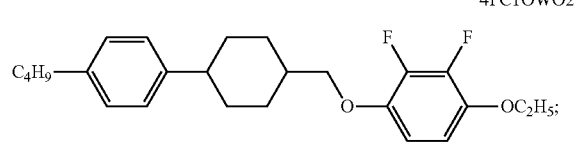

4PC1OWO2 a compound 3C1OWO2 accounting for 12% of the liquid crystal composition

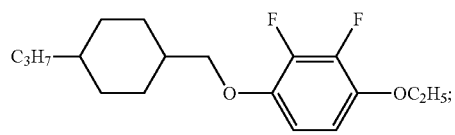

3C1OWO2 a compound 3C1OWO4 accounting for 12% of the liquid crystal composition

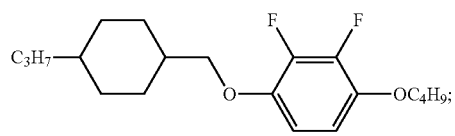

3C1OWO4 a compound 3CC2 accounting for 5% of the liquid crystal composition;

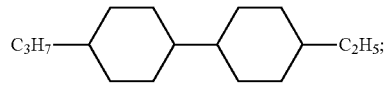

3CC2 a compound 5CCO1 accounting for 4.5% of the liquid crystal composition

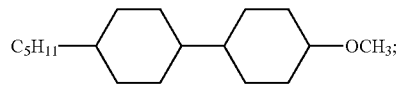

5CCO1 a compound 5CP3 accounting for 8% of the liquid crystal composition

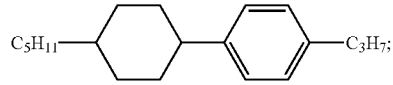

5CP3 a compound 5CC3 accounting for 5% of the liquid crystal composition;

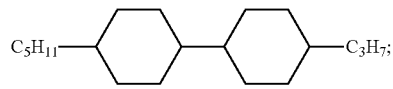

5CC3 a compound III-3 accounting for 0.495% of the liquid crystal composition;

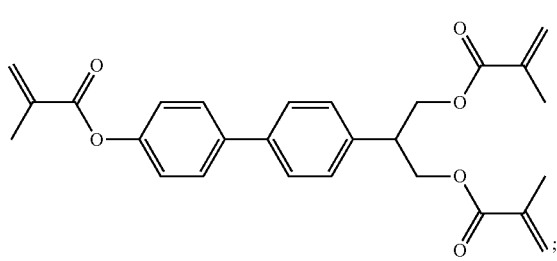

III-3 and a compound II-1 accounting for 0.005% of the liquid crystal composition;

II-1

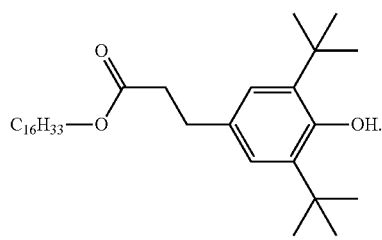

15. The liquid crystal composition of claim 1, wherein the liquid crystal composition comprises, based on the total weight of the liquid crystal composition, based on the total weight of the liquid crystal composition, a compound 2CC1OWO2 accounting for 4% of the liquid crystal composition

2CC1OWO2

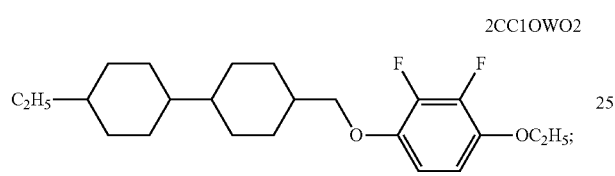

a compound 3CC1OWO2 accounting for 5% of the liquid crystal composition

3CC1OWO2

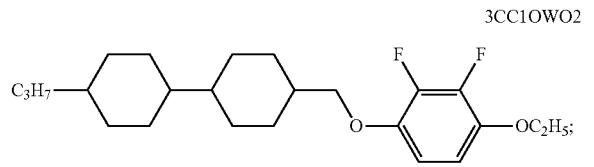

a compound 3CC1OWO3 accounting for 6% of the liquid crystal composition

3CC1OWO3

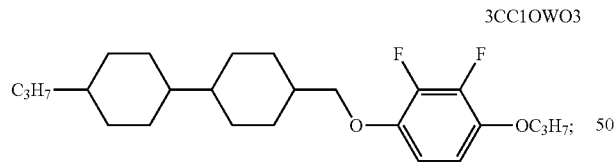

a compound 3C1OWO2 accounting for 5% of the liquid crystal composition

3C1OWO2

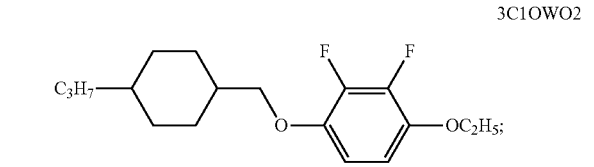

a compound 2CPWO2 accounting for 8% of the liquid crystal composition

2CPWO2

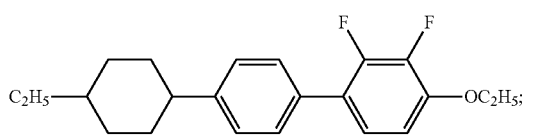

a compound 3CPWO2 accounting for 8% of the liquid crystal composition

3CPWO2

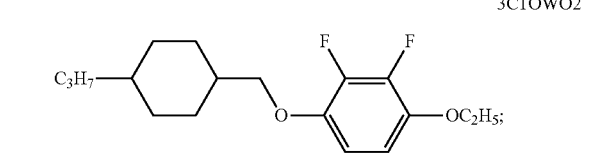

a compound 3CC2 accounting for 22.5% of the liquid crystal composition;

3CC2

C$_3$H$_7$—⌬—⌬—C$_2$H$_5$;

a compound 4CC3 accounting for 10% of the liquid crystal composition

4CC3

C$_4$H$_9$—⌬—⌬—C$_3$H$_7$;

a compound 5CC3 accounting for 10% of the liquid crystal composition;

5CC3

C$_5$H$_{11}$—⌬—⌬—C$_3$H$_7$;

a compound 5PP1 accounting for 8% of the liquid crystal composition

5PP1

C$_5$H$_{11}$—⌬—⌬—CH$_3$;

a compound 3PPO2 accounting for 9% of the liquid crystal composition

3PPO2

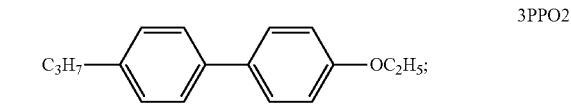

a compound 3CCP1 accounting for 4% of the liquid crystal composition

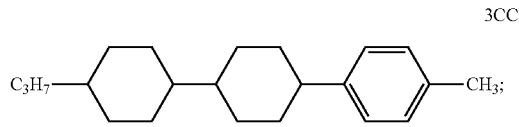

3CCP1 a compound III-2 accounting for 0.495% of the liquid crystal composition;

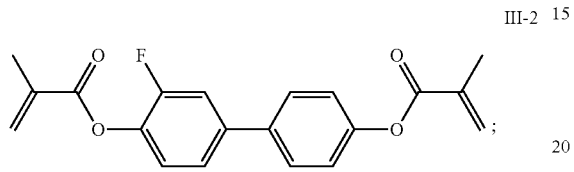

III-2 and
a compound II-1 accounting for 0.005% of the liquid crystal composition;

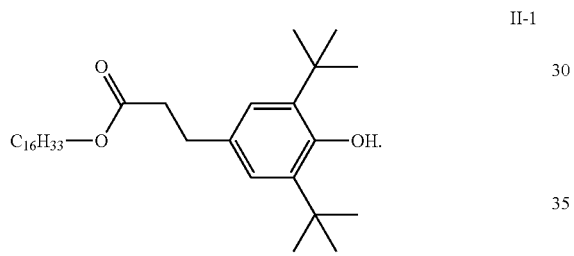

II-1

16. The liquid crystal composition of claim 1, wherein the liquid crystal composition comprises, based on the total weight of the liquid crystal composition, based on the total weight of the liquid crystal composition,
a compound 2DCC1OWO2 accounting for 5% of the liquid crystal composition

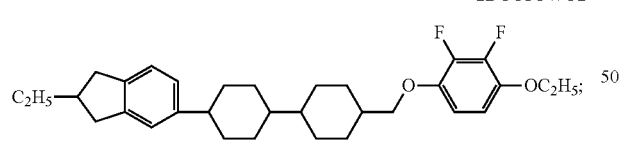

2DCC1OWO2 a compound 3DCC1OWO2 accounting for 4% of the liquid crystal composition

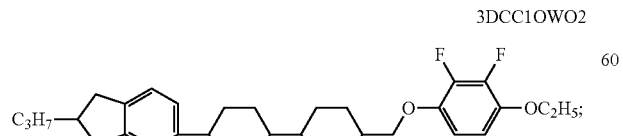

3DCC1OWO2 a compound 3PCC1OWO3 accounting for 5% of the liquid crystal composition

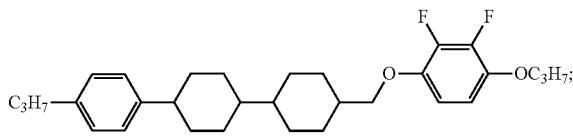

3PCC1OWO3 a compound 3C1OWO2 accounting for 5% of the liquid crystal composition

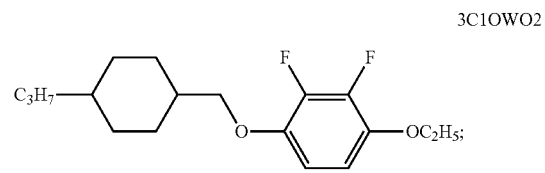

3C1OWO2 a compound 2CPWO2 accounting for 10% of the liquid crystal composition

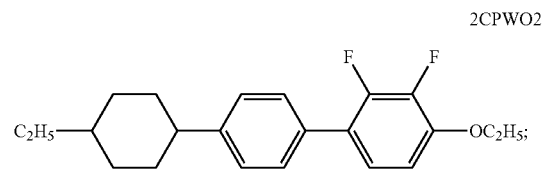

2CPWO2 a compound 3CPWO2 accounting for 10% of the liquid crystal composition

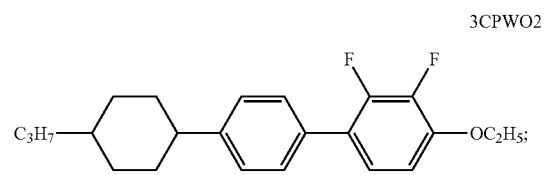

3CPWO2 a compound 3CC2 accounting for 22.5% of the liquid crystal composition;

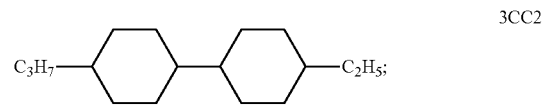

3CC2 a compound 4CC3 accounting for 9% of the liquid crystal composition

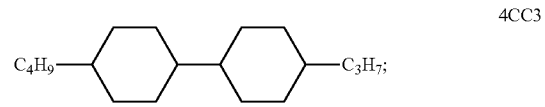

4CC3 a compound 5CC3 accounting for 8% of the liquid crystal composition;

5CC3

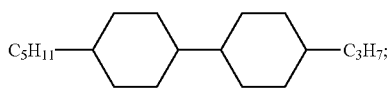

a compound 5PP1 accounting for 9% of the liquid crystal composition

5PP1

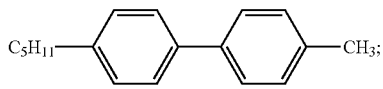

a compound 3PWO2 accounting for 8% of the liquid crystal composition

3PWO2

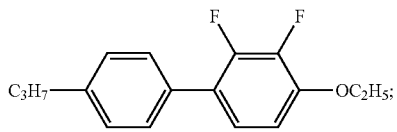

a compound 3CCP1 accounting for 4% of the liquid crystal composition

3CCP1

a compound III-2 accounting for 0.495% of the liquid crystal composition;

III-2

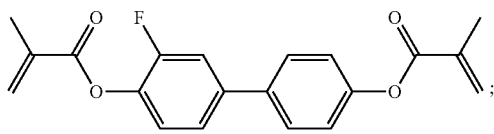

and
a compound II-1 accounting for 0.005% of the liquid crystal composition

II-1

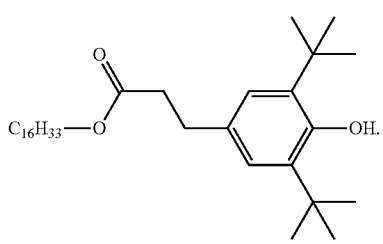

17. The liquid crystal composition of claim 1, wherein the liquid crystal composition comprises, based on the total weight of the liquid crystal composition, based on the total weight of the liquid crystal composition, a compound 2CC1OWO2 accounting for 9% of the liquid crystal composition

2CC1OWO2

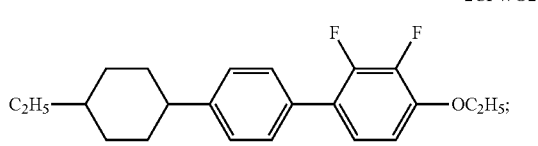

a compound 3CC1OWO2 accounting for 9% of the liquid crystal composition

3CC1OWO2 a compound 3CC1OWO3 accounting for 6% of the liquid crystal composition

3CC1OWO3 a compound 3C1OWO2 accounting for 11% of the liquid crystal composition

3C1OWO2 a compound 2CPWO2 accounting for 8% of the liquid crystal composition

2CPWO2 a compound 3CPWO2 accounting for 8% of the liquid crystal composition

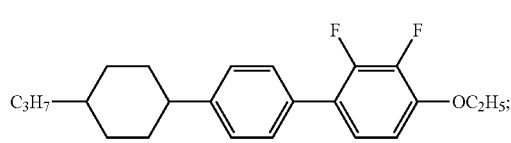
3CPWO2 a compound 3CCV1 accounting for 22.5% of the liquid crystal composition

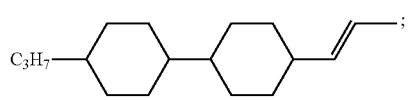
3CCV1 a compound 4CC3 accounting for 6% of the liquid crystal composition

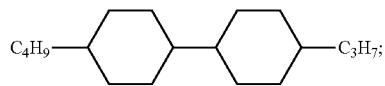
4CC3 a compound 5CC3 accounting for 6% of the liquid crystal composition;

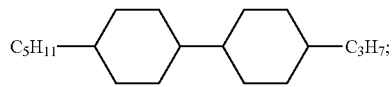
5CC3 a compound 5PP1 accounting for 6% of the liquid crystal composition

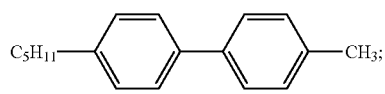
5PP1 a compound 3PPO2 accounting for 4% of the liquid crystal composition

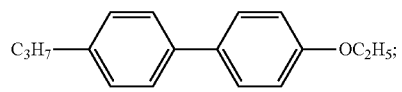
3PPO2 a compound 4PGPP3 accounting for 4% of the liquid crystal composition

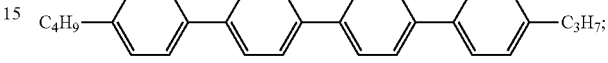
4PGPP3 a compound III-2 accounting for 0.495% of the liquid crystal composition

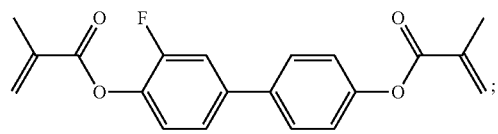
III-2 and
a compound II-1 accounting for 0.005% of the liquid crystal composition;

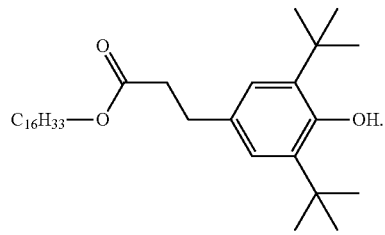
II-1

18. A liquid crystal display device, comprising a liquid crystal composition of claim 1.

* * * * *